United States Patent Office 2,707,713
Patented May 3, 1955

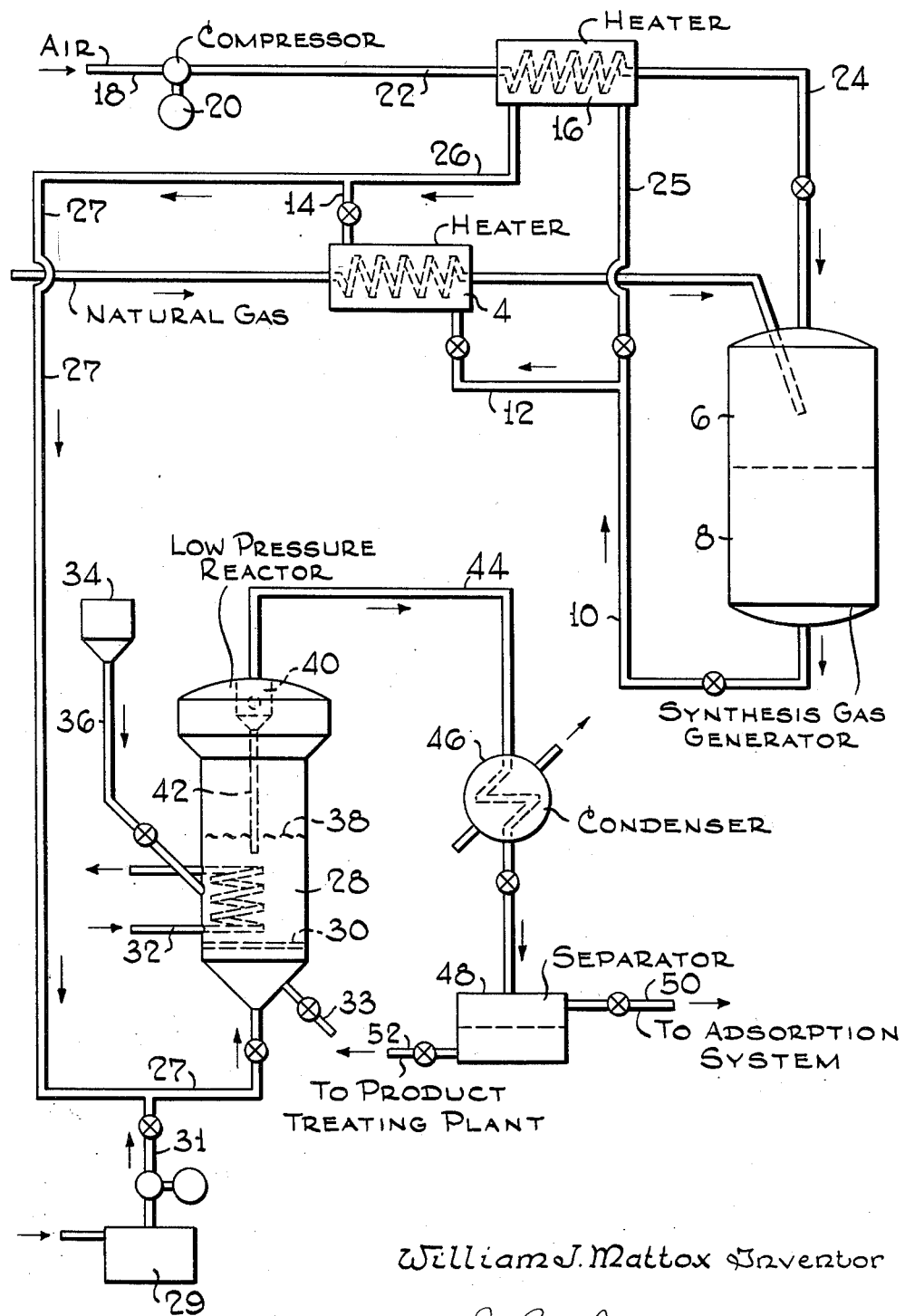

2,707,713

HYDROCARBON SYNTHESIS

William J. Mattox, Baton Rouge, La., assignor to Esso Research and Engineering Company, a corporation of Delaware Application November 17, 1950, Serial No. 196,118

10 Claims. (Cl. 260—449.6)

The present invention relates to catalytic reaction between carbon monoxide and hydrogen to form valuable liquid hydrocarbons. More particularly, the present invention is concerned with improvements in the reaction based on addition of a carbon monoxide oxidation inhibitor to the reaction mixture.

The synthetic production of liquid hydrocarbons from gas mixtures containing various proportions of CO and $H_2$ is a matter of record, and numerous catalysts, usually containing an iron group metal, have been described which are specifically active in promoting the desired reaction at certain preferred operating conditions. For example, cobalt supported on an inert carrier is used when relatively low pressures of about 1–5 atmospheres and low temperatures of about 300°–425° F. are applied in the manufacture of a substantially saturated hydrocarbon product, while at higher temperatures of 450°–750° F. and higher pressures of 15–40 atmospheres required for the production of unsaturated and branch chained products of high anti-knock value, iron type catalysts are more suitable.

In both cases, the reaction is strongly exothermic and the utility of the catalyst declines steadily in the course of the reaction, chiefly due to the deposition of non-volatile conversion products, such as wax, carbon, and the like on the catalyst.

The extremely exothermic character and high temperature sensitivity of the synthesis reaction and the relatively rapid catalyst deactivation have led, in recent years, to the application of the fluid solids technique wherein the synthesis gas is contacted with a turbulent bed of finely divided catalyst fluidized by the gaseous reactants and products. This technique permits continuous catalyst replacement and greatly improved heat dissipation and temperature control.

It is general practice in hydrocarbon synthesis operations to recycle tail gas back to the synthesis reactor in order to obtain high overall conversion of synthesis gas components. However, the recycle gas operation is costly, both from the standpoint of investment and operation because of the large amounts of gas which must be handled in compressors and heat exchangers. In addition, since the fluid reactors have limitations with respect to gas velocities, the added gas volume, due to recycling, necessitates greater reactor cross section in order to stay within proper velocity limitations.

It would be highly desirable, therefore, to be able to operate a hydrocarbon synthesis plant in a once-through operation and to maintain the consumption ratio of the synthesis gas components the same as the feed ratio. Depending upon the source of the synthesis gas, the $H_2/CO$ feed ratio may vary considerably. Thus, when synthesis gas is obtained by the water gas reaction from coal, the $H_2/CO$ ratio of the gas is close to 1 to 1. On the other hand, when it is obtained from partial oxidation of methane, the ratio is closer to 2/1.

Furthermore, most processes for synthesis of hydrocarbons from synthesis gas obtained from coal or natural gas involve the production of relatively pure oxygen for the partial combustion of these raw materials to form CO and $H_2$ which are then reacted in a second step to form the desired hydrocarbons. In order to produce a highly unsaturated hydrocarbon product of high octane value, it is generally considered desirable to operate the synthesis reaction at high pressures of about 400 p. s. i. g. in the presence of an iron catalyst. This, however, involves production of relatively pure oxygen, also at high pressures. It would be uneconomic to employ air at high pressure rather than oxygen, because the recycle requirements associated with an iron catalyst to obtain high overall consumption of $H_2$ and CO would result in the undesirable recirculation of a gas containing an ever-increasing amount of nitrogen.

As indicated above, it would be highly desirable to operate a hydrocarbon synthesis process by the fluid solids technique wherein the synthesis gas is prepared at lower pressures by air instead of by oxygen at high pressures, and wherein the synthesis itself is carried out at moderate instead of at high pressures, wherein a valuable olefinic motor fuel is obtained, and wherein tail gas is not recycled. The art shows many attempts in this direction in fixed bed processes. Thus, it has been attempted to prepare high octane motor fuel using a thoria-promoted cobalt catalyst on a silica gel catalyst. However, it was found that when the variables were adjusted in an effort to improve the liquid yield and the quality of the product, the yield of liquid products increased somewhat with pressure when the temperature was held constant, but the yield of wax increased also. This is quite undesirable because wax formation renders it extremely difficult to maintain a fluidized bed in the reactor. On the other hand, if the pressure is held constant in the relatively low pressure areas where cobalt catalyst functions well, that is, in the region of 15 to about 75 p. s. i. g., the olefin content of the product is low, and attempts to increase the olefinicity by increasing the temperature cause a decrease in liquid product yield and an increase in gas formation.

On the other hand, experience has indicated that operation with a conventional iron catalyst at the lower pressures is usually accompanied by severe carbonization of the catalyst as well as heavy formation of wax, both making the maintenance of a fluid catalyst bed a very great difficulty. Carbonization further causes rupture of iron catalysts resulting in formation of fines which eventually make impossible the maintenance of fluidization and temperature control.

It is the principal object of the present invention to provide an improved and flexible hydrocarbon synthesis process wherein recycle of tail gas is avoided and wherein the $H_2/CO$ consumption ratio within the reactor is substantially the same as the ratio in which $H_2$ and CO are present in the synthesis gas feed, irrespective of the source.

It is also an object of the present invention to provide an improved hydrocarbon synthesis process operable at moderate pressures wherein high yields of valuable liquid synthesis products having a high degree of unsaturation are obtainable and wherein wax formation is minimized.

Other objects of the invention will in part be obvious and will in part appear hereinafter.

In the synthesis of hydrocarbons from carbon monoxide and hydrogen, particularly wherein the synthesis gas contains large quantities of nitrogen, it is obvious that a once-through operation is most desirable, because otherwise large quantities of inert material would be recycled, markedly decreasing the capacity of the plant and the operation. Such nitrogen is present when the synthesis gas is prepared by partial combustion of natural gas with air and moderate pressures, which is of marked economic advantage over preparing the same by combustion with pure oxygen under pressure. Furthermore, in the synthesis of hydrocarbons from CO and $H_2$ employing a once-through operation, it is apparent that the optimum consumption ratio of the reactants should be the same as their ratio in the synthesis feed gas, to avoid losses of unreacted $H_2$ or CO.

For example, in the production of synthesis gas by partial oxidation of methane and natural gas with air, hydrogen and carbon monoxide are produced at a 2/1 ratio. When such a gas is used as a feed to the synthesis reactor, the elimination of oxygen in the form of water rather than carbon dioxide is essential for an approximately 2/1 $H_2/CO$ consumption ratio, in accordance with the reaction.

(1) $\quad 2nH_2 + nCO \rightarrow (CH_2)_n + nH_2O$

This is essentially the course of the reaction when cobalt is employed as a synthesis catalyst, and is thus ideally suited for a once-through operation when the synthesis feed gas has an $H_2/CO$ ratio of 2/1. However, as indicated above and as is well known, cobalt catalyst is not conducive to formation of olefinic hydrocarbons valuable as motor fuel. On the other hand, when an iron catalyst is employed, the overall reaction can be more nearly represented by (2) $\quad 3nH_2 + 3nCO \rightarrow 2(CH_2)_n + nH_2O + nCO_2$ The $CO_2$ that occurs along with the products of the synthesis reaction, as in (2) above, may be a result of the reversible water gas shift reaction (3) $\quad CO + H_2O \rightleftharpoons CO_2 + H_2$ Thus, in the synthesis reaction according to (1) above, the consumption ratio of hydrogen to carbon monoxide is 2/1. However, since some of the water formed in (1) may react with some unconverted CO in accordance with (3) hydrogen is formed and CO is consumed which in effect lowers the $H_2/CO$ consumption ratio. Carried to its limit, the ultimate effect of this reaction would be for all of the $H_2O$ formed to react rapidly and irreversibly with CO in which the net synthesis reaction could be written as (4) $\quad nH_2 + 2nCO \rightarrow (CH_2)_n + nCO_2$ giving an $H_2/CO$ consumption ratio of 0.5/1. From the above it may be seen that, starting with a 2/1 $H_2/CO$ feed gas, the $H_2/CO$ consumption ratio may vary from about 2/1 to almost 0.5/1 depending upon the degree to which the water gas shift reaction takes place.

During the normal synthesis with an iron catalyst, and iron is considered to be an excellent shift catalyst, the water gas constants $$K = \frac{(CO_2)(H_2)}{(CO)(H_2O)}$$

calculated from the gas concentrations in the reactor are only 60–95% of the known water-gas equilibrium constants at temperatures in the range of 550°–650° F. The known values for K at 550° F. and at 650° F. are about 50 and 23, respectively. The low calculated values indicate that the amounts of $CO_2$ and $H_2$ present are inadequate fully to satisfy the water gas shift equilibrium and that the reaction of CO and $H_2O$ are slower than the synthesis reaction.

Summarizing, therefore, the removal of oxygen in the synthesis reaction when cobalt is employed as catalyst appears to be accomplished by its elimination as water, and the reaction is accompanied by an $H_2/CO$ consumption ratio of about 2 to 1. However, the olefinicity of the product is low and the reaction is accompanied by significant wax formation. On the other hand, when an iron hydrocarbon synthesis catalyst is employed, oxygen is eliminated mainly in the form of $CO_2$, which latter must be recycled to the reactor in order to maintain high overall conversions of $H_2$ and CO. Because of the water gas shift reaction, the overall $H_2/CO$ consumption is substantially less than the $H_2/CO$ ratio in the feed.

Thus, all iron catalysts hitherto evaluated in once-through operation have given consumption ratios that were considerably lower than the 1/1 to 2/1 $H_2/CO$ feed ratios. As indicated above, the usually accepted explanation for the high proportion of $H_2$ in the exit gas streams has been based on the water gas shift reaction, since $CO_2$ was formed in relatively large quantities and the water gas shift components were present in amounts corresponding to about 45 to 95% of the known values for the equilibrium constant at 550° to 700° F.

It has been found that the water gas shift reaction may be effectively inhibited and oxidation of CO by water minimized when halogens and volatile halides are added in small quantities, either continuously or intermittently, to the synthesis gas feed or to the synthesis reactor. As a result of the addition of these inhibitors, not only is the water gas shift reaction substantially inhibited even in the presence of an active water gas shift catalyst such as pyrites ash and high $H_2/CO$ consumption ratios obtained, but also increased yields of olefins are obtained.

It has now been found that the results obtained by halogen or volatile halide addition are closely related to the synthesis promoter associated with the iron-containing catalysts. Though for many purposes, catalyst promoters, such as alkali metal salts, may be considered interchangeable and equivalent, this is no longer true when halide or volatile halogen inhibitors are added to the synthesis reaction. Thus, for instance, whereas KCl, $K_2CO_3$ and KF in substantially equal concentrations in the range of about 0.5–3.0% have approximately equivalent promotional effect upon the activity of an iron-containing synthesis catalyst, such as pyrites ash, the addition of halides or halogen to the synthesis reactor causes marked differences to occur, particularly in product unsaturation and $H_2/CO$ consumption ratio.

Furthermore, when volatile halide and halogen promoters are employed, promoter stability and lack of susceptibility to poisoning are important.

In accordance with the present invention, is has been found that the maximum utilization of the effects of a halogen or volatile halide water gas shift inhibitor is realized when there is employed, along with the inhibitor, a non-volatile halogen-containing catalyst promoter wherein the halogen is of the same species as the halogen inhibitor. Thus, when a chlorine-containing volatile inhibitor is employed, considerably superior results are obtained by using an alkali metal chloride promoter as compared to using a fluoride or a carbonate. When a bromine or fluorine-containing inhibitor is employed, bromide or fluoride promoters respectively are employed.

In brief compass, by introducing a small amount of halogen compound, such as methyl chloride, in quantities as low as 0.06 mol percent of the feed, into a hydrocarbon synthesis zone wherein an iron-containing catalyst is employed, said catalyst being promoted with 0.5 to 4% of a metallic salt promoter, the non-metallic portion of which is a halogen of the same type as that present in the inhibitor, i. e., here a chloride, such as KCl, the $H_2/CO$ consumption ratio of a synthesis gas has been greatly increased, as has also, the olefinicity of the product. Thus, with a 1% KCl promoted pyrites ash catalyst at 500° F., methyl chloride was effective in increasing the $H_2/CO$ consumption ratio from a value of about 0.8, which is the usual value for an iron catalyst, to over 2/1. Under the same conditions, employing a KF or a $K_2CO_3$ promoter increased the consumption ratio only to 1.5–1.7. Besides adding these shift inhibitors to the feed, under certain circumstances, these inhibitors may be used to pretreat the promoted catalyst.

The invention will best be understood by referring to the accompanying drawing which represents diagrammatically one of the modifications of the present invention, where suitable equipment and flow of material are shown for carrying the same into execution. In this embodiment, synthesis gas obtained by partial oxidation of natural gas is employed, though it will be understood that any source of synthesis gas having any desired $H_2/CO$ ratio within the limits of about 1/1 to 2/1 may be employed.

Referring now in detail to the drawing, natural gas from any convenient source preheated in preheater 4 is passed to synthesis gas producer vessel 6, which comprises a catalytic oxidation zone. Simultaneously, air is passed through line 18 into compressor 20, wherein it is moderately compressed to about 50–100 p. s. i. g. and the compressed material is passed through line 22 and preheater 16, wherein it is preheated to about 1200° F., and introduced into synthesis generation plant 6. In generator 6, partial oxidation mainly to CO and $H_2$ takes place. The temperature in the oxidation zone may be of the order of 2000°–2500° F. The lower portion 8 of generator 6 may comprise a catalytic reformer bed, containing a reforming catalyst such as nickel or copper on magnesia, and any $CO_2$ and $H_2O$ formed as a result of combustion in the upper part of the generator will reform unreacted methane to produce further quantities of $H_2$ and CO.

The hot synthesis gases leaving generator 6, which are at a temperature of about 1600°–1800° F. are passed through line 10 and are preferably employed to preheat the incoming natural gas and air in preheaters 4 and 16, respectively, the synthesis gas stream being divided for this purpose to pass through lines 12 and 14, and through lines 25 and 26. The reunited synthesis gas stream, which has been cooled as indicated to about 450°–600° F., and which may be further cooled if desired, is passed to the bottom of hydrocarbon synthesis reactor 28. The latter is preferably in the form of a vertical cylinder with a conical base and an upper expanded section, and has a grid or screen located in the lower section to effect good gas distribution.

Within reactor 28, a mass of iron-containing synthesis catalyst, is maintained in the form of a finely divided powder having a particle size distribution from about 100–400 mesh, preferably in the range of about 150–250 mesh. The catalyst mixture is supplied from catalyst hopper 34 through line 36. The catalyst may be any iron-type, supported or unsupported hydrocarbon synthesis catalyst, such as pyrites ash, mill scale, reduced iron supported on an active carbon support, or the like, suitably promoted, as detailed below.

From storage vessel 29 there is passed continuously or intermittently a stream of a halogen-containing compound which preferably is volatile at hydrocarbon synthesis conditions. Halogens and halides of all types may be employed, volatile chlorides such as $CH_3Cl$, $C_6H_5Cl$, HCl, and chlorine are particularly effective. In the present embodiments, a chlorine-containing material, such as $CH_3Cl$ is considered. The halogen-containing material may be passed through line 31 and pumped into the synthesis gas inlet line 27 or directly into the reactor 28 through line 33. The amount of additive may vary from about 0.001 to 0.5% of the amount of synthesis gas added though, as indicated below, it is not necessary in all cases to maintain steady input of halogen additive. Thus, as described in an illustrative example below, the favorable effects of halogen addition were still noticeable after about 236 hours or more on stream, even though the addition of halogen was terminated at the end of 140 hours.

The synthesis gas mixture, having a molar ratio of $H_2/CO$ of about 2 or less, flows upwardly through grid 30. The linear velocity of the gas within the reactor is kept within the approximate range of 0.1–3 feet per second, preferably about 0.4–1.5 feet per second so as to maintain the catalyst in the form of a dense, highly turbulent fluidized mass having a well defined upper level 38 and an apparent density of from about 30–150 lbs. per cu. ft., depending upon the fluidization conditions.

The invention is particularly applicable for production of olefinic hydrocarbons at low pressures, and the pressure within reactor 28 is kept within the limits of 50–100 p. s. i. g., though, if desired, the process may be applied to the more conventional pressures associated with iron synthesis catalysts up to 400–600 p. s. i. g. The temperature is maintained constant within the limits of about 450°–650° F. Surplus heat from the exothermic reaction may be withdrawn by any conventional means, such as internal cooling coil 32.

Only a minor portion of the catalyst is carried into the disengaging section of the reactor above level 38, and these catalyst particles are separated from the reaction products in a conventional gas-solids separator, such as cyclone 40 and returned to the dense bed via dip pipe 42. The rate of gas throughput is in the range of 2–20 volumes of synthesis gas per weight of catalyst per hour. There need be no provisions for tail gas recycle, as in accordance with the invention, this costly process is no longer necessary.

Product vapor and gases are withdrawn overhead from reactor 28 and are passed through line 44 and condenser 46 to liquid products separator 48, wherein liquid products are separated from gases. The liquid products, containing high yields of olefins with little or no wax may be withdrawn through line 52 to further processing such as fractionation, cracking of the gas oil fraction, isomerization, polymerization, etc., all in a manner known per se.

The uncondensed gases, comprising lower molecular weight hydrocarbons as well as unreacted synthesis gas and nitrogen, are preferably passed through line 50 to a fluidized solids active carbon adsorption plant, wherein light hydrocarbons may be removed and recovered by desorption at the lower pressures of the present operation. This represents a considerably more economical process than the conventional oil absorption of tail gas.

In accordance with the present invention, in the present embodiment the catalyst is promoted with 1 to 2% by weight of a chlorine-containing promoter substantially non-volatile under the synthesis conditions. Suitable are alkali and alkaline earth chlorides, $FeCl_3$, and $MgCl_2$. KCl is particularly effective. Should a volatile bromide or bromine have been employed as the inhibitor, suitable promoters would be, for instance, alkali metal bromides, barium, calcium and magnesium bromides, and iron and zinc bromides, etc. When a volatile fluorine compound is employed, suitable promoters are alkali metal fluorides, barium, calcium and magnesium fluorides, and iron, aluminum and zinc fluoride.

The above substantially non-volatile promoter type halides are not necessarily equivalent in their effectiveness in producing the benefits enumerated and, although the chlorides will probably be of greatest utility due to availability, cost, general efficiency, etc., the bromide-bromine and fluoride-fluorine combinations may also be particularly advantageous under certain operating conditions of temperature, pressure, and $H_2/CO$ feed ratio.

The present invention admits of numerous modifications apparent to those skilled in the art. Thus instead of producing synthesis gas from partial combustion of natural gas or methane by air at low pressures, synthesis gas may also be prepared by the water gas reaction from coal. In such case, depending on how heat is furnished to the process, either by direct combustion of coke or coal within the water gas generator with air or by recycling of hot combustion solids from a burner vessel, the synthesis gas may or may not contain appreciable quantities of nitrogen. The ratio of $H_2/CO$ in synthesis gas prepared from coal is about 1/1, and such a synthesis gas may be passed through a shift converter to increase the feed gas ratio from 1/1 to about 2/1 or any intermediate values. In such system, also, a sulfur removal step would be introduced, such as by passing the synthesis gases through spent synthesis catalyst to remove sulfur.

Furthermore, if the synthesis gas is prepared from coal, halogen or halide addition may be advantageous not only in the synthesis step proper but also during the production of synthesis gas. Thus, the formation of $CO_2$ during the conversion of coal to synthesis gas with steam and oxygen may be minimized by the addition of small amounts of halides or halogen-containing compounds, the carbon thus being oxidized to CO without substantial loss to $CO_2$. The halogen-containing compound and/or decomposition product may then be allowed to pass with the synthesis gas to the synthesis reactor as above.

If desired, the halogen additives may be recovered from the synthesis product for reuse. This recovery may readily be accomplished as in the case of HCl, or a compound which during reaction is converted to HCl, or other water-soluble halogen compound as a constant boiling mixture which may be recycled by vaporization in the desired quantities in the feed gas. Also, halogen or halide-containing compounds dissolved in the oil layer may, if desired, be recycled to the feed or to the synthesis reactor to provide active additive. Further advantage also may be derived in the final finishing treat where, in the presence of hydrohagolens, such as HCl, the alumina, bauxite, or other alumina-containing treating agent is made more effective as an olefin isomerizing agent, thereby enhancing the desired anti-knock properties of the finished gasoline.

As an alternative, since the effect of the additive is of long duration, in certain cases it may be sufficient to treat the catalyst with the additive prior to the introduction of synthesis gas and obtain the improvements illustrated in the examples below.

Furthermore, it may be desirable in once-through operations, to employ one or more additional synthesis reactors in order to effect substantially complete conversion of $H_2$ and CO. Since the $H_2$/CO ratio of the exit gas from a hydrocarbon synthesis operation in which halide addition is employed is almost the same as the feed gas to the operation, synthesis gas conversion is thus readily increased without requirement of adjusting gas composition between stages.

Though pyrites ash has been described as particularly suitable for the present process, it is to be understood that any iron-containing catalyst, or mixed catalyst one of whose constituents is iron, may be used. The catalyst may be either supported or unsupported. Supports may be activated carbon, kieselguhr, silica gel, etc., and such support may be impregnated, say, with $FeCl_2$ or $FeCl_3$, followed by precipitation with ammonia, heat treating, and promotion with suitable promoter.

The invention may be further illustrated by the following specific example, representing fixed bed laboratory data. The example delineates the effect of adding methyl chloride with the synthesis gas upon the $H_2$/CO consumption ratio and product olefinicity when employing a KCl-promoted iron pyrites catalyst. Included for comparison are data taken from runs where no halogen compound additive is initially added, and also from runs where the promoter was a non-chlorine containing compound.

*Synthesis of hydrocarbons with promoted pyrites ash catalysts after addition of methyl chloride—Effect of promoter composition*

[Feed: 2/1 $H_2$/CO; pressure: 75 p. s. i. g.; v./v./hr.: 100; temperature: 500° F.]

| Catalyst Promoter | 2% $K_2CO_3$ | | | | 1% KF | | | | | 1% KCl | | |
|---|---|---|---|---|---|---|---|---|---|---|---|---|
| Run HSSP | 490 | 490 | 490 | 490 | 496 | 496 | 496 | 496 | 496 | 469 | 469 | 469 |
| Halide Additive, Mol Percent $CH_3Cl$ | None | 0.14 | None | None | None | 0.21 | 0.21 | None | None | None | 0.15 | None |
| Run Hours | 21-68 | 73-92 | 98-116 | 117-140 | 19-90 | 98-114 | 115-138 | 141-162 | 211-258 | 69-92 | 99-140 | 146-236 |
| CO Conv., Percent Output | 93 | 77 | 56 | 54 | 86 | 71 | 41 | 44 | 51 | 91 | 33 | 30 |
| $H_2$ Conv., Percent Output | 27 | 36 | 45 | 43 | 26 | 39 | 40 | 35 | 39 | 37 | 31 | 31 |
| $H_2$/CO Cons. Ratio, Output | 0.62 | 0.86 | 1.71 | 1.70 | 0.57 | 0.90 | 1.61 | 1.52 | 1.46 | 0.83 | 1.74 | 2.03-2.07 |
| Selectivity: | | | | | | | | | | | | |
| CO to $CO_2$, Percent Output | 43.2 | 30.6 | 24.5 | 24.7 | 41.6 | 35.6 | 14.8 | 11.9 | 14.8 | | | |
| Percent C to Cl | 10.3 | 8.1 | 8.5 | 9.2 | 9.6 | 7.3 | 4.5 | 9.7 | 10.8 | 13.4 | | 11.2 |
| Percent C to $C_2$ | 9.2 | 8.7 | 10.8 | 12.4 | 9.6 | 11.1 | 11.4 | 12.3 | 13.6 | 10.1 | | 14.0 |
| cc. $C_3+$/m.³ $H_2+CO$, Cons | 265 | 294 | 221 | 214 | 285 | 268 | 267 | 271 | 262 | 251 | | 233-244 |
| cc. $C_4+$/m.³$H_2+CO$— | | | | | | | | | | | | |
| Fed | 106 | 118 | 78 | 72 | 107 | 97 | 80 | 57 | 74 | 104 | | 44-52 |
| Consumed | 221 | 235 | 162 | 155 | 235 | 193 | 195 | 76 | 173 | 190 | | 147-170 |
| Exit Gases: | | | | | | | | | | | | |
| Percent Unsats. in— | | | | | | | | | | | | |
| $C_2$ | 65 | 55 | 61 | 54 | 66 | 53 | 65 | 57 | 61 | 11 | | 47-54 |
| $C_3$ | 81 | 85 | 87 | 82 | 74 | 84 | 78 | 76 | 79 | 57 | | 73-78 |
| $C_4$ | 74 | 76 | 80 | 100 | 91 | 81 | 88 | 100 | 89 | 83 | | 94-100 |
| Oil Product: | | | | | | | | | | | | |
| Bromine No | 61 | 92 | 96 | 96 | 70 | | | 107 | 107 | 68 | 96 | 87 |
| Est. Unsat., Percent | 69 | 79 | 80 | 80 | 74 | | | 83 | 83 | 52 | 100 | 74 |

The above data clearly show the improved consumption ratios obtainable, coupled with increased product olefinicity, when a volatile chlorine-containing compound is added to the synthesis process wherein an iron catalyst is employed, which is promoted in turn with a non-volatile chlorine-containing compound. Consumption ratios obtained when the promoter was $K_2CO_3$ or KF were considerably lower, although they in turn were superior to those obtained when no halogen compound was added to the feed.

It will also be noted that when the volatile halogen addition is discontinued, in the case of the KCl promoter, the beneficial effects of the halogen addition as reflected in high $H_2$/CO consumption ratios continued to increase, i. e., to improve from 1.74 to 2.07 for a 2/1 synthesis gas feed. In the case of the KF promoter, the halting of the methyl chloride injection was accompanied by drop of consumption ratio. As for the $K_2CO_3$ promoter, though consumption ratios increased after halting chloride injection, they never reached a level as high as in the case of the KCl promoted catalyst.

Though the invention has been described at length in accordance with the embodiment wherein the synthesis reaction is carried out at low pressures under once-through conditions, it is to be understood that the halogen and volatile halide addition features in conjunction with the appropriate halide promoted catalyst may advantageously be applied to synthesis operations employing more conventional elevated pressures, and to operations wherein part or all of the tail gas is recycled. Irrespective of type of operation, consumption ratios and product quality in terms of olefinicity is always improved.

Though the illustrations have shown the effect of adding chlorine-containing substances as additives to repress the water-gas shift reaction and thus repress $CO_2$ formation, it is not intended to restrict the invention to these substances but to include other halogens and halides, as bromides, fluorides, iodides, etc., which are volatile under the reaction conditions prevailing in the hydrocarbon synthesis reaction zone. These halogen-containing additives, termed for convenience as "inhibitors," are to be distinguished of course, from the class of substances known as "promoters," such as KCl, KBr, KF, CaF$_2$, etc., which are substantially non-volatile at synthesis conditions, which promote the conversion of synthesis gas but which do not inhibit the water gas shift reaction. Thus, when operating in accordance with the present invention, a suitably promoted iron group catalyst is employed in conjunction with adding a volatile halogen or compound with the feed. Thus, suitable for addition as additives or inhibitors are volatile non-metallic halogen compounds (or halogens); the compounds may include, beside one or more halogen atoms, one or more of the following atoms: hydrogen, carbon, and oxygen. Also, halogenated metalloids, and non-metals such as phosphorous, etc., may be employed.

While the foregoing description and exemplary operations have served to illustrate specific applications and results of the invention, other modifications obvious to those skilled in the art are within its scope.

What is claimed is:

1. An improved process for producing valuable liquid and gaseous olefinic hydrocarbons by causing the hydrogenation of CO which comprises feeding synthesis gas comprising H$_2$ and CO in synthesis proportions into a hydrocarbon synthesis zone, contacting an iron type finely divided fluidized synthesis catalyst promoted with a minor amount of a non-volatile alkali metal halide salt the halogen component of which salt is one of the class consisting of chlorine and bromine at synthesis conditions of temperature and pressure with a gaseous mixture of H$_2$, CO, and a non-metalilc halogen-containing material volatile under said synthesis conditions in said zone, the halogen component of said last-named material being the same halogen species as the halogen component of said promoter, contacting the reactants with said catalyst for a sufficient period of time to obtain the desired conversion, and recovering a product containing substantial amounts of olefinic compounds boiling in the gasoline range.

2. The process of claim 1 wherein said synthesis conditions include temperatures in the range of from about 450–750° F., and pressures in the range of about 50–600 p. s. i. g.

3. The process of claim 1 wherein said volatile halogen-containing material is added to said synthesis zone with synthesis gas feed.

4. The process of claim 1 wherein said volatile halogen-containing material is added to said zone in amounts sufficient to inhibit formation of CO$_2$.

5. The process of claim 4 in which said volatile material is added in amounts of about 0.001–0.5 mol percent of the synthesis gas feed.

6. The process of claim 1 in which said volatile halogen-containing material is a volatile non-metallic halide.

7. Process of claim 1 in which said volatile halogen-containing material contains also at least one other element selected grom the group consisting of carbon, hydrogen, oxygen and phosphorus.

8. The process of claim 7 wherein said halide is an organic halide.

9. The process of claim 6 wherein said promoter is a metallic chloride and said volatile halogen-containing material comprises chlorine.

10. An improved once-through low pressure process for preparing high yields of valuable olefinic hydrocarbons from synthesis gas comprising H$_2$ and CO which comprises passing CO, H$_2$, and a volatile non-metallic halogen-comprising material which halogen is one of the class consisting of chlorine and bromine into a hydrocarbon synthesis zone, contacting said gaseous mixture with a dense turbulent mass of a finely divided iron-containing synthesis catalyst promoted with a non-volatile metal halide, the halogen constitutent of which is the same as the halogen constituent of said first-named halogen-comprising material, maintaining a pressure of about 50–100 p. s. i. g., and a temperature of about 450–650° F., within said zone, and withdrawing a product containing high yields of liquid and gaseous olefinic material.

References Cited in the file of this patent

UNITED STATES PATENTS

| | | |
|---|---|---|
| 2,053,233 | Woodhouse | Sept. 1, 1936 |
| 2,194,186 | Pier et al. | Mar. 19, 1940 |
| 2,245,157 | Pier et al. | June 10, 1941 |
| 2,254,806 | Michael | Sept. 2, 1941 |
| 2,515,245 | Mattox | July 18, 1950 |
| 2,542,464 | Black et al. | Feb. 20, 1951 |